(12) United States Patent
Lee et al.

(10) Patent No.: US 10,538,128 B2
(45) Date of Patent: Jan. 21, 2020

(54) SILYL GROUP-CONTAINING NOVEL COMPOUND, MODIFIED AND CONJUGATED DIENE-BASED POLYMER, AND METHOD FOR PREPARING SAME

(71) Applicant: LG Chem, Ltd., Seoul (KR)

(72) Inventors: He Seung Lee, Daejeon (KR); No Ma Kim, Daejeon (KR); Hae Sung Sohn, Daejeon (KR)

(73) Assignee: LG Chem, Ltd. (KR)

(*) Notice: Subject to any disclaimer, the term of this patent is extended or adjusted under 35 U.S.C. 154(b) by 139 days.

(21) Appl. No.: 15/736,005

(22) PCT Filed: Dec. 23, 2016

(86) PCT No.: PCT/KR2016/015237
§ 371 (c)(1),
(2) Date: Dec. 13, 2017

(87) PCT Pub. No.: WO2017/111557
PCT Pub. Date: Jun. 29, 2017

(65) Prior Publication Data
US 2018/0170102 A1 Jun. 21, 2018

(30) Foreign Application Priority Data

Dec. 24, 2015 (KR) .................... 10-2015-0186332
Dec. 22, 2016 (KR) .................... 10-2016-0177039

(51) Int. Cl.

| | | |
|---|---|---|
| *B60C 1/00* | (2006.01) | |
| *C08C 19/25* | (2006.01) | |
| *C08C 19/22* | (2006.01) | |
| *C08F 8/42* | (2006.01) | |
| *C08L 9/06* | (2006.01) | |
| *C08F 236/06* | (2006.01) | |
| *C08F 8/30* | (2006.01) | |
| *C08L 25/10* | (2006.01) | |

(52) U.S. Cl.
CPC ............... *B60C 1/00* (2013.01); *C08C 19/22* (2013.01); *C08C 19/25* (2013.01); *C08F 8/30* (2013.01); *C08F 8/42* (2013.01); *C08F 236/06* (2013.01); *C08L 9/06* (2013.01); *C08L 25/10* (2013.01)

(58) Field of Classification Search
None
See application file for complete search history.

(56) References Cited

U.S. PATENT DOCUMENTS

| | | | |
|---|---|---|---|
| 4,397,994 A | 8/1983 | Takeuchi et al. | |
| 7,052,773 B2 * | 5/2006 | Bacher | D21H 19/56 |
| | | | 428/514 |
| 2013/0158205 A1 | 6/2013 | Lee et al. | |
| 2014/0243476 A1 | 8/2014 | Lee et al. | |
| 2014/0371383 A1 | 12/2014 | Hayata et al. | |
| 2015/0376321 A1 | 12/2015 | Lee et al. | |
| 2016/0053059 A1 | 2/2016 | Kim et al. | |
| 2017/0066850 A1 | 3/2017 | Lee et al. | |

FOREIGN PATENT DOCUMENTS

| | | |
|---|---|---|
| CN | 103764682 A | 4/2014 |
| CN | 104271608 A | 1/2015 |
| JP | S58059203 A | 4/1983 |
| JP | H06248247 A | 9/1994 |
| JP | 2004018587 A | 1/2004 |
| JP | 4088481 B2 | 5/2008 |
| JP | 2013127064 A | 6/2013 |
| JP | 2014177519 A | 9/2014 |
| JP | 2014534291 A | 12/2014 |
| JP | 2015520789 A | 7/2015 |
| KR | 20140127716 A | 11/2014 |
| KR | 20150037671 A | 4/2015 |

OTHER PUBLICATIONS

Search report from International Application No. PCT/KR2016/015237, dated Mar. 31, 2017.
Nadeem, U., et al., "Co-poly(vinyl chloride-vinyl acetate-vinyl alcohol)-Silica Nanocomposites from Sol-Gel Process: Morphological, Mechanical, and Thermal Investigations." Journal of Applied Polymer Science, May 14, 2012, vol. 126, No. 6, pp. 1814-1821.
Chinese Search Report for Application No. CN201680043802.8 dated Jun. 26, 2019.
Extended European Search Report including Written Opinion for Application No. EP16879424.6 dated Jul. 10, 2018.

* cited by examiner

*Primary Examiner* — Robert T Butcher
(74) *Attorney, Agent, or Firm* — Lerner, David, Littenberg, Krumholz & Mentlik, LLP

(57) ABSTRACT

The present invention relates to a modifier useful for modifying a polymer, a method for preparing a modified and conjugated diene-based polymer using the same, and a modified and conjugated diene-based polymer prepared thereby. In the modified and conjugated diene-based polymer, a hydroxyl group and a silyl group are combined, and the affinity thereof with a silica-based filler may be excellent. Accordingly, a rubber composition including the modified and conjugated diene-based polymer may have excellent processability, and as a result, molded articles (for example, tires) manufactured from the rubber composition may have excellent tensile strength, abrasion resistance, and viscoelasticity properties.

18 Claims, No Drawings

SILYL GROUP-CONTAINING NOVEL COMPOUND, MODIFIED AND CONJUGATED DIENE-BASED POLYMER, AND METHOD FOR PREPARING SAME

CROSS-REFERENCE TO RELATED APPLICATIONS

The present application is a national phase entry under 35 U.S.C. § of International Application No. PCT/KR2016/015237, filed on Dec. 23, 2016, which claims priority from Korean Patent Application Nos. 10-2015-0186332, filed on Dec. 24, 2015, and 10-2016-0177039, filed on Dec. 22, 2016, the disclosures of which are incorporated herein by reference.

TECHNICAL FIELD

The present invention relates to a silyl group-containing compound which is useful in modifying a polymer, a modified and conjugated diene-based polymer including a functional group which is derived from the compound, and a method for preparing the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for a tire.

In order to reduce the running resistance of a tire, there is a method of reducing hysteresis loss of a vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubber, polyisoprene rubber, or polybutadiene rubber is known as a rubber material having low hysteresis loss, but these rubbers have a limitation of low wet skid resistance. Thus, recently, a conjugated diene-based (co)polymer, such as styrene-butadiene rubber (hereinafter, referred to as "SBR") and butadiene rubber (hereinafter, referred to as "BR"), is prepared by emulsion polymerization or solution polymerization to be used as rubber for a tire. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for a tire because it is easy to change a structure of the finally prepared SBR or BR, and movement of chain terminals may be reduced and a coupling force with a filler, such as silica and carbon black, may be increased by coupling or modification of the chain terminals.

In a case where the solution-polymerized SBR is used as the rubber material for a tire, since a glass transition temperature of the rubber is increased by increasing the vinyl content in the SBR, physical properties, such as running resistance and braking force, required for a tire may not only be controlled, but fuel consumption may also be reduced by appropriately adjusting the glass transition temperature.

The solution-polymerized SBR is prepared by using an anionic polymerization initiator, and is being used by coupling or modification of chain terminals of the polymer thus formed using various modifiers.

For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, carbon black and silica are being used as a reinforcing filler of a tire tread, wherein, in a case where the silica is used as the reinforcing filler, the hysteresis loss may be low and the wet skid resistance may be improved. However, since the silica having a hydrophilic surface has a low affinity with the rubber in comparison to the carbon black having a hydrophobic surface, dispersibility may be poor, and, thus, there is a need to use a separate silane coupling agent to improve the dispersibility or provide coupling between the silica and the rubber.

Therefore, a method of introducing a functional group having an affinity or reactivity with the silica into the terminals of rubber molecules is being performed, but its effect is insufficient.

Accordingly, the development of rubber having high affinity with a filler such as silica is required.

DISCLOSURE OF THE INVENTION

Technical Problem

The present invention has been devised in consideration of the above-mentioned problems, and the object of the present invention is to provide a compound including a constituent unit represented by Formula 1, which is useful in modifying a polymer.

Another object of the present invention is to provide a modified and conjugated diene-based polymer including a functional group derived from the compound.

Still another object of the present invention is to provide a method for preparing a modified and conjugated diene-based polymer using the compound.

Technical Solution

To solve the above-described tasks, the present invention provides a compound including a constituent unit represented by the following Formula 1:

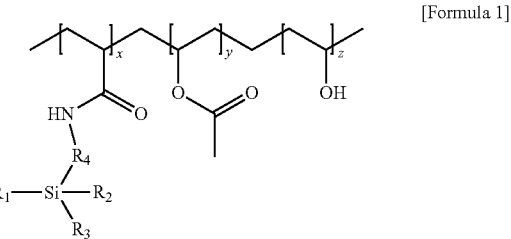

[Formula 1]

in Formula 1, $R_1$ to $R_3$ are each independently $C_{1-20}$alkyl, $C_{1-20}$alkoxy, or $C_{3-20}$allyl, where at least one of $R_1$ to $R_3$ is $C_{1-20}$alkoxy, $R_4$ is $C_{1-20}$alkylene, x, y and z represent each independently a molar ratio of each repeating unit constituting the constituent unit, where x+y+z is 1, x is 0.1 to 0.8,
y is 0.1 to 0.8, and
z is 0.1 to 0.8.

In addition, the present invention also provides a modified and conjugated diene-based polymer represented by the following Formula 4 or Formula 5, and including a functional group derived from the compound:

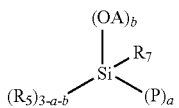

[Formula 4]

in Formula 4, $R_5$ is $C_{1-20}$alkyl, $C_{1-20}$alkoxy, or $C_{3-20}$allyl, $R_7$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S, P is a conjugated diene-based polymer chain, a and b are each independently an integer of 1 or 2, where a+b is 2 or 3,

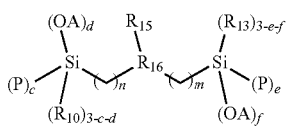

[Formula 5]

in Formula 5, $R_{10}$ and $R_{13}$ are each independently $C_{1-20}$alkyl, $C_{1-20}$alkoxy, or $C_{3-20}$allyl, $R_{15}$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S, $R_{16}$ is a heteroatom of N, O, or S, where in a case where $R_{16}$ is O or S, $R_{15}$ is not present, P is a conjugated diene-based polymer chain, c to f are each independently an integer of 0 to 3, where c+e is 1 to 5, and d+f is 1 to 3, n and m are each independently an integer of 1 to 1000, in Formula 4 and Formula 5, A is a substituent represented by the following Formula 6:

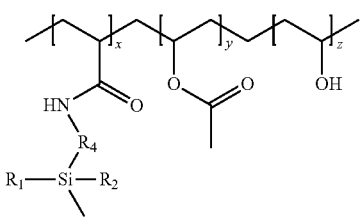

[Formula 6]

in Formula 6, $R_1$ and $R_2$ are each independently $C_{1-20}$alkyl, $C_{1-20}$alkoxy, or $C_{3-20}$allyl, $R_4$ is $C_{1-20}$alkylene, x, y and z represent each independently a molar ratio of each repeating unit constituting the constituent unit, where x+y+z is 1, x is 0.1 to 0.8,
y is 0.1 to 0.8, and
z is 0.1 to 0.8.

In addition, there is provided in the present invention a method for preparing the modified and conjugated diene-based polymer, including polymerizing a conjugated diene-based monomer, or an aromatic vinyl-based monomer and a conjugated diene-based monomer in the presence of an organometal compound in a hydrocarbon solvent to prepare an active polymer in which an organometal is combined with at least one terminal thereof (step 1); performing a first reaction of the active polymer with a compound represented by the following Formula 2 or Formula 3 (step 2); and performing a second reaction with a compound including a constituent unit represented by the following Formula 1, after performing the first reaction (step 3):

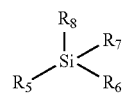

[Formula 2]

in Formula 2, $R_5$, $R_6$ and $R_8$ are each independently $C_{1-20}$alkyl, $C_{1-20}$alkoxy, or $C_{3-20}$allyl, where at least one of $R_5$, $R_6$ and $R_8$ is $C_{1-20}$alkoxy, $R_7$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S,

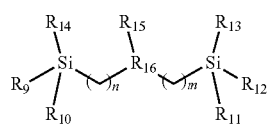

[Formula 3]

in Formula 3, $R_9$ to $R_{14}$ are each independently $C_{1-20}$alkyl, $C_{1-20}$alkoxy, or $C_{3-20}$allyl, where at least one of $R_9$ to $R_{14}$ is $C_{1-20}$alkoxy, $R_{15}$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S, $R_{16}$ is a heteroatom of N, O, or S, where in a case where $R_{16}$ is O or S, $R_{15}$ is not present, n and m are each independently an integer of 1 to 1000,

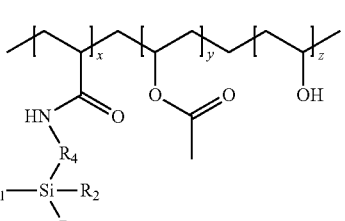

[Formula 1]

in Formula 1, $R_1$ to $R_3$ are each independently $C_{1-20}$alkyl, $C_{1-20}$alkoxy, or $C_{3-20}$allyl, where at least one of $R_1$ to $R_3$ is $C_{1-20}$alkoxy, $R_4$ is $C_{1-20}$alkylene, x, y and z represent each independently a molar ratio of each repeating unit constituting the constituent unit, where x+y+z is 1, x is 0.1 to 0.8,
y is 0.1 to 0.8, and
z is 0.1 to 0.8.

Advantageous Effects

In the modified and conjugated diene-based polymer according to the present invention, a hydroxyl group and a silyl group are combined, and affinity with a silica-based filler may be excellent. Accordingly, a rubber composition including the modified and conjugated diene-based polymer may have excellent processability, and as a result, molded articles (for example, tires) manufactured using the rubber composition may have excellent tensile strength and viscoelasticity.

BEST MODE FOR CARRYING OUT THE INVENTION

Hereinafter, the present invention will now be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The present invention provides a silyl group-containing compound which may be usefully used as a modifier of a polymer, for example, a conjugated diene-based polymer.

The compound according to an embodiment of the present invention is characterized in including a constituent unit represented by the following Formula 1.

In particular, in Formula 1, $R_1$ to $R_3$ may be each independently $C_{1-10}$alkyl or $C_{1-10}$alkoxy, where at least one of $R_1$ to $R_3$ may be $C_{1-10}$alkoxy, and $R_4$ may be a linker connecting a silane group and an isocyanate group and may be $C_{1-10}$alkylene.

The compound according to an embodiment of the present invention may be a modifier for a polymer, and particularly, may be a modifier for a conjugated diene-based polymer.

In addition, the compound containing the constituent unit represented by Formula 1 according to the present invention includes a hydroxyl group and an alkoxysilane group, and may easily modify a conjugated diene-based polymer in a high modification ratio. Thus, a rubber composition including the compound and molded articles such as tires, which are manufactured therefrom, may have improved abrasion resistance, viscoelasticity, or the like. In particular, the compound includes a hydroxyl group and an alkoxysilane group in a molecule and shows high reactivity with respect to the active part of a conjugated diene-based polymer, thereby modifying the conjugated diene-based polymer in a high modification ratio. In addition, a modified and conjugated diene-based polymer having a functional group substituted by a modifier may have improved affinity with a filler and improved processability.

Meanwhile, a compound containing the constituent unit represented by Formula 1 according to an embodiment of the present invention may be prepared via a polymerization reaction of a saponified polyvinyl acetate (PVA) with a monomer containing a silyl group, for example, may be prepared by reacting a saponified polyvinyl acetate with a monomer containing a silyl group in an equivalent ratio of 0.1 mol to 10 mol, more particularly, 1 mol to 2 mol based on the saponified polyvinyl acetate. In this case, the saponified polyvinyl acetate (PVA) is prepared by the saponification reaction of polyvinyl acetate, and includes hydroxyl groups in a molar ratio of 1 mol % to 99 mol % based on the total mole number, and has a weight average molecular weight of 100 g/mol to 50,000 g/mol. In particular, the saponified polyvinyl acetate includes hydroxyl groups in a molar ratio of 1 mol % to 80 mol % based on the total molar number, and has a weight average molecular weight of 1,000 g/mol to 30,000 g/mol.

In a specific embodiment, the compound including a constituent unit represented by Formula 1 may be prepared via the following Reaction 1:

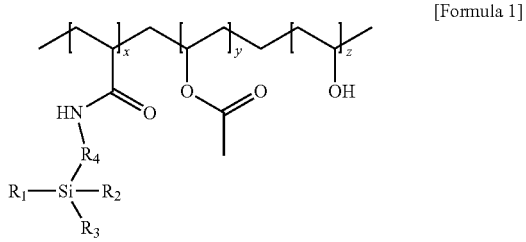

[Formula 1]

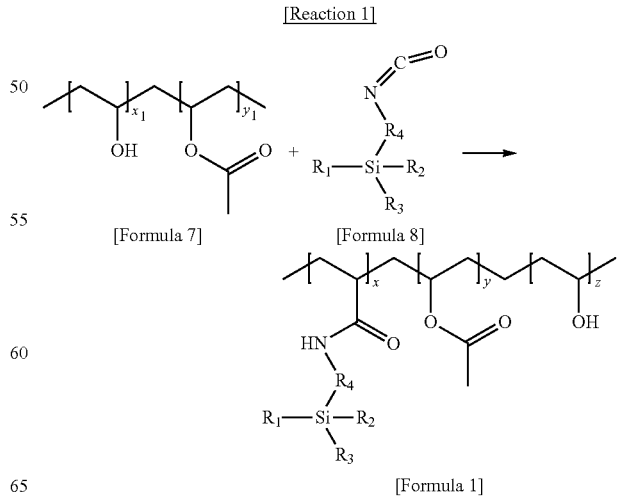

[Reaction 1]

in Formula 1, $R_1$ to $R_3$ are each independently $C_{1-20}$alkyl, $C_{1-20}$alkoxy, or $C_{3-20}$allyl, where at least one of $R_1$ to $R_3$ is $C_{1-20}$alkoxy, $R_4$ is $C_{1-20}$alkylene, x, y and z represent each independently a molar ratio of each repeating unit constituting the constituent unit, where x+y+z is 1, x is 0.1 to 0.8,
y is 0.1 to 0.8, and
z is 0.1 to 0.8.

In Reaction 1, $R_1$ to $R_4$, x, y, and z in Formula 1, Formula 7 and Formula 8 are the same as defined above, and in Formula 7, $x_1$ and $y_1$ represent the molar ratios of repeating units constituting the constituent unit, where $x_1+y_1=1$, $x_1$ is 0.1 to 0.9, and $y_1$ is 0.1 to 0.9.

In addition, the present invention provides a modified and conjugated diene-based polymer having excellent affinity with a reinforcing filler, specifically, with a silica-based filler, and improved processability.

The modified and conjugated diene-based polymer according to an embodiment of the present invention is represented by the following Formula 4 or Formula 5, and includes a functional group derived from the compound including a constituent unit represented by Formula 1.

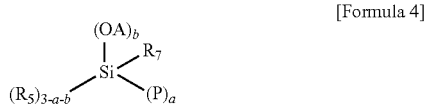

[Formula 4]

in Formula 4, $R_5$ is $C_{1-20}$alkyl, $C_{1-20}$alkoxy, or $C_{3-20}$allyl $R_7$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S, P is a conjugated diene-based polymer chain, a and b are each independently an integer of 1 or 2, where a+b is 2 or 3,

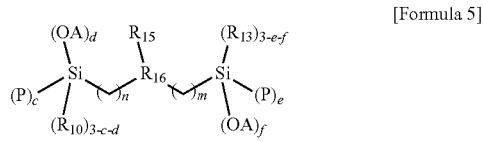

[Formula 5]

in Formula 5, $R_{10}$ and $R_{13}$ are each independently $C_{1-20}$alkyl, $C_{1-20}$alkoxy, or $C_{3-20}$allyl, $R_{15}$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S, $R_{16}$ is a heteroatom of N, O, or S, where in a case where $R_{16}$ is O or S, $R_{15}$ is not present, P is a conjugated diene-based polymer chain, c to f are each independently an integer of 0 to 3, where c+e is 1 to 5, and d+f is 1 to 3, n and m are each independently an integer of 1 to 1000, in Formula 4 and Formula 5, A is a substituent represented by the following Formula 6:

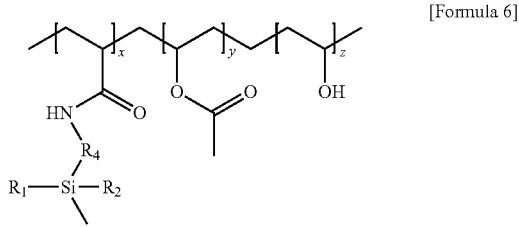

[Formula 6]

in Formula 6, $R_1$ and $R_2$ are each independently $C_{1-20}$alkyl, $C_{1-20}$alkoxy, or $C_{3-20}$allyl, $R_4$ is $C_{1-20}$alkylene, x, y and z represent each independently a molar ratio of each repeating unit constituting the constituent unit, where x+y+z is 1, x is 0.1 to 0.8, y is 0.1 to 0.8, and z is 0.1 to 0.8.

In particular, in Formula 4 to Formula 6, $R_1$, $R_2$, $R_5$, $R_{10}$ and $R_{13}$ may be each independently $C_{1-10}$alkyl or $C_{1-10}$alkoxy, $R_4$ may be $C_{1-10}$alkylene, $R_7$ and $R_{15}$ may be each independently $C_{1-10}$alkyl; or $C_{1-10}$alkyl which is substituted or unsubstituted with $C_{1-10}$alkyl or alkylsilyl which is mono-, di-, or tri-substituted with $C_{1-10}$alkyl, where the $C_{1-10}$alkyl includes N or S, and $R_{16}$ may be N.

More particularly, $R_7$ and $R_{15}$ may be each independently a substituent represented by the formula of $(X_1)_j$—$H_1$—$(X_2)_{h-j}$, where $X_1$ and $X_2$ are each independently alkyl, —NR'R", —SiR'R"R'", [—Y—SiR'R"R'"], or [—Y—$H_2$—$(Z)_{k-1}$], and $X_1$ and $X_2$ may be combined with each other to form a ring, Y is a divalent linker and may be alkylene, and Z may be each independently a hydrogen atom, alkyl, —NR'R", or —SiR'R"R'". In this case, $H_1$ and $H_2$ may be each independently N or S, R', R" and R'" may be each independently a hydrogen atom or alkyl, h may be an atomic valence of $H_1$, k may be an atomic valence of $H_2$, and j may be an integer of 0 to 2.

Particular embodiments of $R_7$ and $R_{15}$ may be the substituents represented by the following Formulae (i) to (vii), where TMS may mean trimethylsilane, and R may mean alkyl.

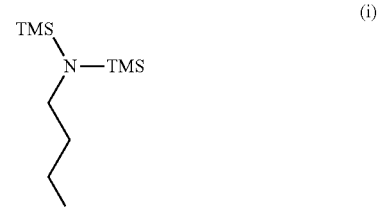

(i)

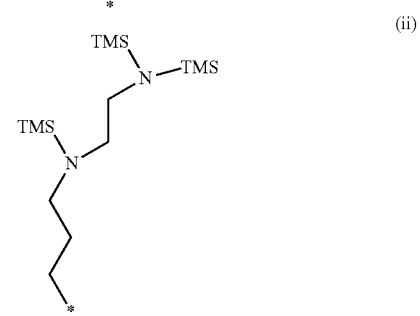

(ii)

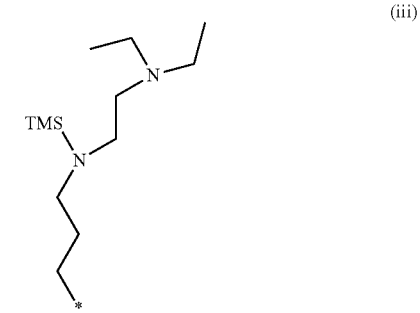

(iii)

-continued

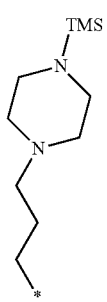
(iv)

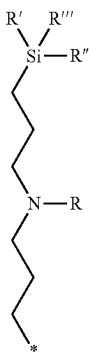
(v)

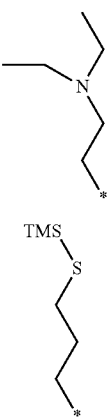
(vi)

(vii)

In Formulae (i) to (vii), * means a bonding site of a substituent.

Meanwhile, the modified and conjugated diene-based polymer according to an embodiment of the present invention may be prepared by the subsequently described preparation method, and may include a functional group derived from the subsequently described Formula 2 or Formula 3 and a functional group derived from a compound including a constituent unit represented by Formula 1, particularly, a hydroxyl group and a silyl group. In addition, the combination ratio of a hydroxyl group and a silyl group in the modified and conjugated diene-based polymer may be different according to a compound including a constituent unit represented by Formula 1, which is used in a secondary reaction.

In the modified and conjugated diene-based polymer, a hydroxyl group and a silyl group are combined with a polymer chain, and affinity with a filler, specifically, a silica-based filler may be excellent. Accordingly, compounding properties with the filler may be excellent, and the processability of a rubber composition including the modified and conjugated diene-based polymer may be excellent, and as a result, molded articles, for example, tires manufactured using the rubber composition may have improved tensile strength, abrasion resistance, and wet traction.

Meanwhile, the modified and conjugated diene-based polymer may be a homopolymer of a conjugated diene-based monomer, or a copolymer of a conjugated diene-based monomer and an aromatic vinyl-based monomer.

In the case where the modified and conjugated diene-based polymer is a copolymer of a conjugated diene-based monomer and an aromatic vinyl-based monomer, the copolymer may be a random copolymer.

Here, the expression "random copolymer" in the present disclosure may denote that constituent units of the copolymer are disorderly arranged.

In the case where the modified and conjugated diene-based polymer is a copolymer of a conjugated diene-based monomer and an aromatic vinyl-based monomer, the modified and conjugated diene-based polymer may include an aromatic vinyl-based monomer derived unit in an amount of 40 wt % or less, particularly, 10 wt % to 40 wt %, and more particularly, 15 wt % to 40 wt %.

Here, the expression "derived unit" may denote a component or structure come from a certain material or may denote the material itself.

In addition, the modified and conjugated diene-based polymer may have a number average molecular weight of 1,000 g/mol to 5,000,000 g/mol, and particularly, 10,000 g/mol to 1,000,000 g/mol.

The modified and conjugated diene-based polymer may have a weight average molecular weight of 2,000 g/mol to 10,000,000 g/mol, and particularly, 20,000 g/mol to 2,000,000 g/mol.

Here, each of the weight average molecular weight and the number average molecular weight is a converted molecular weight analyzed by gel permeation type chromatography (GPC) with polystyrene standard.

In addition, the modified and conjugated diene-based polymer may have the vinyl content of 5 wt % or more, particularly, 10 wt % or more, and more particularly, 10 wt % to 50 wt %. If the vinyl content is in the range, a glass transition temperature may be controlled in an appropriate range, and when the modified and conjugated diene-based polymer is applied to tires, physical properties required for tires such as running resistance and braking force may be excellent, and reducing effect of fuel consumption may be attained.

In this case, the vinyl content denotes the content of not a 1,4-added but 1,2-added conjugated diene-based monomers based on 100 wt % of a conjugated diene-based polymer composed of monomers having a vinyl group and conjugated diene-based monomers.

In addition, the present invention provides a method for preparing the modified and conjugated diene-based polymer.

The preparation method according to an embodiment of the present invention is characterized in including, polymerizing a conjugated diene-based monomer, or an aromatic vinyl-based monomer and a conjugated diene-based monomer in the presence of an organometal compound in a hydrocarbon solvent to prepare an active polymer in which an organometal is combined with at least one terminal thereof (step 1); performing a first reaction of the active polymer with a compound represented by the following Formula 2 or Formula 3 (step 2); and performing a second reaction with a compound including a constituent unit represented by the following Formula 1, after performing the first reaction (step 3):

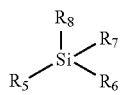

[Formula 2]

in Formula 2, $R_5$, $R_6$ and $R_8$ are each independently $C_{1-20}$alkyl, $C_{1-20}$alkoxy, or $C_{3-20}$allyl, where at least one of $R_5$, $R_6$ and $R_8$ is $C_{1-20}$alkoxy, $R_7$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S,

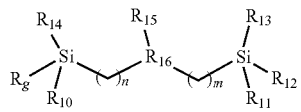

[Formula 3]

in Formula 3, $R_9$ to $R_{14}$ are each independently $C_{1-20}$alkyl, $C_{1-20}$alkoxy, or $C_{3-20}$allyl, where at least one of $R_9$ to $R_{14}$ is $C_{1-20}$alkoxy, $R_{15}$ is $C_{1-20}$alkyl; or $C_{1-20}$alkyl or alkylsilyl, which is substituted or unsubstituted with $C_{1-20}$alkyl or alkylsilyl which is mono-, di- or tri-substituted with $C_{1-20}$alkyl, where the $C_{1-20}$alkyl or alkylsilyl includes at least one heteroatom selected from N, O and S, $R_{16}$ is a heteroatom of N, O, or S, where in a case where $R_{16}$ is O or S, $R_{15}$ is not present, n and m are each independently an integer of 1 to 1000,

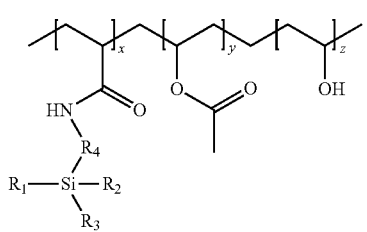

[Formula 1]

in Formula 1, $R_1$ to $R_3$ are each independently $C_{1-20}$alkyl, $C_{1-20}$alkoxy, or $C_{3-20}$allyl, where at least one of $R_1$ to $R_3$ is $C_{1-20}$alkoxy, $R_4$ is $C_{1-20}$alkylene, x, y and z represent each independently a molar ratio of each repeating unit constituting the constituent unit, where x+y+z is 1, x is 0.1 to 0.8, y is 0.1 to 0.8, and z is 0.1 to 0.8.

In particular, in Formula 1, $R_1$ to $R_3$ may be each independently $C_{1-10}$alkyl, or $C_{1-10}$alkoxy, where at least one of $R_1$ to $R_3$ may be $C_{1-10}$alkoxy, and $R_4$ may be $C_{1-10}$alkylnene.

In addition, in Formula 2, $R_5$, $R_6$, and $R_8$ may be each independently $C_{1-10}$alkyl, or $C_{1-10}$alkoxy, where at least one of $R_5$, $R_6$, and $R_8$ may be $C_{1-10}$alkoxy, and $R_7$ may be $C_{1-10}$alkyl; or $C_{1-10}$alkyl which is substituted or unsubstituted with $C_{1-10}$alkyl or alkylsilyl which is mono-, di- or tri-substituted with $C_{1-10}$alkyl, where the $C_{1-10}$alkyl includes N or S.

In addition, in Formula 3, $R_9$ to $R_{14}$ may be each independently $C_{1-10}$alkyl, or $C_{1-10}$alkoxy, where at least one of $R_9$ to $R_{14}$ may be $C_{1-10}$alkoxy, $R_{15}$ may be $C_{1-10}$alkyl; or $C_{1-10}$alkyl which is substituted or unsubstituted with $C_{1-10}$alkyl or alkylsilyl which is mono-, di- or tri-substituted with $C_{1-10}$alkyl, where the $C_{1-10}$alkyl includes N or S, $R_{16}$ may be N, and n and m may be each independently an integer of 1 to 50.

Step 1 is a step for preparing an active polymer in which an alkali metal is combined with at least one terminal thereof, and is performed by polymerizing conjugated diene-based monomers, or conjugated diene-based monomers and aromatic vinyl-based monomers in the presence of an organometal compound in a hydrocarbon solvent.

In the polymerization of step 1, conjugated diene-based monomers alone, or both conjugated diene-based monomers and aromatic vinyl-based monomers may be used as monomers. That is, the polymer prepared through the preparation method according to an embodiment of the present invention may be a conjugated diene-based monomer derived homopolymer, or a copolymer derived from conjugated diene-based monomers and aromatic vinyl-based monomers.

The conjugated diene-based monomer may be, for example, at least one selected from the group consisting of 1,3-butadiene, 2,3-dimethyl-1,3-butadiene, piperylene, 3-butyl-1,3-octadiene, isoprene, and 2-phenyl-1,3-butadiene, without specific limitation.

The aromatic vinyl-based monomer may be, for example, at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene, without specific limitation.

In the case where the modified and conjugated diene-based polymer is a copolymer of the conjugated diene-based monomers and the aromatic vinyl-based monomers, the conjugated diene-based monomers may be used in an amount such that an amount of the conjugated diene-based monomer derived units in a prepared modified and conjugated diene-based polymer is 60 wt % or more, particularly, from 60 wt % to 90 wt %, more particularly, from 60 wt % to 85 wt %.

The hydrocarbon solvent is not specifically limited and may be, for example, at least one selected from the group consisting of n-pentane, n-hexane, n-heptane, isooctane, cyclohexane, toluene, benzene and xylene.

The organometal compound may be used in a ratio of 0.01 mmol to 10 mmol based on 100 g of the total monomers.

The organometal compound may be, for example, at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide, without specific limitation.

The polymerization of step 1 may be performed by further adding a polar additive as needed, and the polar additive may be added in an amount of 0.001 parts by weight to 10 parts by weight based on 100 parts by weight of the total monomers. Particularly, the addition amount may be 0.001 parts by weight to 1 part by weight, more particularly, 0.005 parts by weight to 0.1 part by weight based on 100 parts by weight of the total monomers.

The polar additive may be at least one selected from the group consisting of tetrahydrofuran, ditetrahydrofurylpropane, diethyl ether, cycloamyl ether, dipropyl ether, ethylene dimethyl ether, ethylene dimethyl ether, diethyl glycol, dimethyl ether, tertiary butoxyethoxyethane, bis(3-dimethylaminoethyl)ether, (dimethylaminoethyl) ethyl ether, trimethylamine, triethylamine, tripropylamine, and tetramethylethylenediamine.

In the preparation method according to an embodiment of the present invention, when conjugated diene-based monomers and aromatic vinyl-based monomers are copolymerized, the difference of the reaction rates between them may be compensated by the addition of the polar additive, and the formation of a random copolymer may be easily induced.

The polymerization of the step 1 may be performed by an adiabatic polymerization, or a polymerization at a constant temperature.

Here, the adiabatic polymerization means a polymerization method including a step of polymerizing using self-generated heat of reaction without optionally applying heat after adding a polyfunctional anionic polymerization initiator. The polymerization at a constant temperature means a polymerization method by which the temperature of a polymer is kept constant by optionally applying heat or taking heat after adding a polyfunctional anionic polymerization initiator.

The polymerization may be performed in a temperature range of −20° C. to 200° C., particularly, 0° C. to 150° C., and more particularly, 10° C. to 120° C.

The step 2 is a step of first reacting the active polymer and a compound represented by Formula 2 or Formula 3 to combine a polymer chain with a functional group derived from the compound represented by Formula 2 or Formula 3.

The compound represented by Formula 2 or Formula 3 may be used in a ratio of 0.01 mol to 5 mol based on 1 mol of the organometal compound.

The step 3 is a step for preparing a modified and conjugated diene-based polymer in which a functional group derived from a compound represented by Formula 2 or Formula 3 is combined with a functional group derived from a compound including a constituent unit represented by Formula 1, and is a step of performing a second reaction with the compound comprising the constituent unit represented by Formula 1 after the first reaction.

Particularly, a modifier including the constituent unit represented by Formula 1 may be combined with an unreacted alkoxy group in a polymer chain after the first reaction and may be used in a ratio of 0.01 mol to 5 mol based on 1 mol of the organometal compound.

The first reaction and the second reaction of the step 2 and step 3 according to an embodiment of the present invention are modification reactions for introducing a functional group to a polymer, and particularly, the first reaction may be a coupling reaction or a modification reaction, and the second reaction may be a modification reaction. Each reaction may be performed in a temperature range of 10° C. to 120° C. for 10 minutes to 5 hours.

Meanwhile, the second reaction may be performed by adding a modifier including the constituent unit represented by Formula 1 at the recovery step of the polymer prepared after the first reaction.

The preparation method according to an embodiment of the present invention may further include at least one step of recovering and drying of a solvent and an unreacted monomer after the step 3 as needed.

Further, there is provided in the present invention, a rubber composition including the modified and conjugated diene-based polymer.

The rubber composition according to an embodiment of the present invention may include the modified and conjugated polymer in an amount of 10 wt % or more, particularly, 10 wt % to 100 wt %, and more particularly 20 wt % to 90 wt %. If the amount of the modified and conjugated diene-based polymer is less than 10 wt %, improving effect of abrasion resistance and crack resistance of molded articles, for example, tires, manufactured by using the rubber composition may be insignificant.

In addition, the rubber composition may further include other rubber components, if necessary, in addition to the modified and conjugated diene-based polymer, and, in this case, the rubber component may be included in an amount of 90 wt % or less based on the total weight of the rubber composition.

Particularly, the rubber component may be a natural rubber or a synthetic rubber, and the rubber component may be, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a solution polymerization styrene-butadiene copolymer (SSBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acryl rubber, a urethane rubber, a silicone rubber, an epichlorohydrin rubber, a butyl rubber, a halogenated butyl rubber, and any one or a mixture of at least two thereof may be used.

Also, the rubber composition according to an embodiment of the present invention may include 0.1 parts by weight to 200 parts by weight of a filler based on 100 parts by weight of the modified and conjugated diene-based polymer, and the filler may be a silica-based filler, a carbon black-based filler, or a combination thereof.

Meanwhile, in the case where a silica-based filler is used as the filler, dispersibility may be largely improved, and hysteresis loss may be largely decreased due to the combination of silica particles of the filler with the terminal of the modified and conjugated diene-based polymer. In addition, in the case where the silica-based filler is used as the filler, a silane coupling agent may be used together in the rubber composition according to an embodiment of the present invention for the improvement of reinforcing and low exothermic properties.

The silane coupling agent may particularly include bis(3-triethoxysilylpropyl)tetrasulfide, bis(3-triethoxysilylpropyl) trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N, N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of at least two thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, a modified and conjugated diene-based polymer in which a functional group having high affinity with a silica-based filler is introduced at an active part as a rubber component is used, and the amount of compounding of the silane coupling agent may be smaller than a common case. In particular, the silane coupling agent may be used in an amount of 1 part by weight to 20 parts by weight based on 100 parts by weight of the silica-based filler. When used in the above range, effects as a coupling agent may be sufficiently exhibited, and the gelation of the rubber component may be prevented. More particularly, the silane coupling agent may be used in an amount of 5 parts by weight to 15 parts by weight based on 100 parts by weight of silica.

In addition, the rubber composition according to an embodiment of the present invention may be sulfur crosslinkable, and so may further include a vulcanizing agent.

The vulcanizing agent may be particularly a sulfur powder and may be included in an amount of 0.1 parts by weight to 10 parts by weight based on 100 parts by weight of a rubber component. With the amount in the above range, elasticity and strength required for a vulcanized rubber composition may be secured, and at the same time, a low fuel combustion ratio may be attained.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator is not specifically limited and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight based on 100 parts by weight of the rubber component.

In addition, the process oil acts as a softener in a rubber composition and may particularly include paraffin-based, naphthene-based, or aromatic compound. More particularly, the aromatic process oil may be used in consideration of tensile strength and abrasion resistance, and the naphthene-based or paraffin-based process oil may be used in consideration of hysteresis loss and low temperature properties. The process oil may be included in an amount of 100 parts by weight or less based on 100 parts by weight of the rubber component, for example, 10 parts by weight to 100 parts by weight, particularly, 20 parts by weight to 80 parts by weight based on 100 parts by weight of the conjugated diene-based polymer. With the above-described amount of the process oil, the deterioration of the tensile strength and the low exothermic properties (low fuel combustion ratio) of the vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low exothermic properties and good abrasion resistance may be obtained due to a vulcanization process after a molding process.

Therefore, the rubber composition may be usefully used for the manufacture of each member of a tire such as a tire tread, an under tread, a side wall, a carcass coating rubber, a belt coating rubber, a bead filler, a chafer, and a bead coating rubber, or for the manufacture of rubber products for various industries such as a dustproof rubber, a belt conveyor, and a hose.

Also, there is provided in the present invention a tire manufactured using the rubber composition.

The tire may include a tire or a tire tread.

Hereinafter, the present invention will be explained in particular referring to non-limiting embodiments. However, the following embodiments and experimental embodiments are only for the illustration of the present invention, and the scope of the present invention is not limited thereto.

Preparation Example 1

1 mmol of saponified polyvinyl acetate (saponification degree of 85 mol %, weight average molecular weight of 4,000 g/mol) and 10 mmol of (dimethylmethoxysilyl)propyl isocyanate were stirred and mixed in ethanol, and reacted at 80° C. for 24 hours to prepare a compound including a constituent unit represented by the following Formula (viii). The compound thus prepared and including the constituent unit represented by the following Formula (viii) was identified by nuclear magnetic resonance spectroscopy (HNMR).

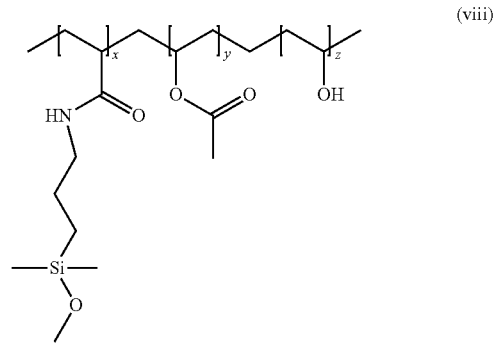

(viii)

In Formula (viii), x was 0.2, y was 0.1, and z was 0.7.

$^1$H NMR (500 MHz, $C_2H_5OH\_d_6$) δ 0.1 (broad, Si—$CH_3$), 0.7 (broad, $CH_2$—$CH_2$), 0.9 (broad, $CH_2$—$CH_2$), 1.5 (broad, $CH_2$—$CH_2$), 2.0 (broad, OCO—$CH_3$), 3.5 (broad, Si—$OCH_3$), 4.0 (broad, $CH_2$—CH), 4.5 (broad, CH—OH), 6.7 (broad, 1H).

In the analysis results, δ 6.7 (broad, 1H) was shown, and from this, the combination of —OH of the saponified polyvinyl acetate and —NCO of the (dimethylmethoxysilyl) propyl isocyanate was confirmed.

Preparation Example 2

1 mmol of saponified polyvinyl acetate (saponification degree of 40 mol %, weight average molecular weight of 4,000 g/mol) and 10 mmol of (dimethylmethoxysilyl)propyl isocyanate were stirred and mixed in ethanol, and reacted at 80° C. for 24 hours to prepare a compound including a constituent unit represented by the following Formula (ix). The compound thus prepared and including the constituent unit represented by the following Formula (ix) was identified by nuclear magnetic resonance spectroscopy (HNMR).

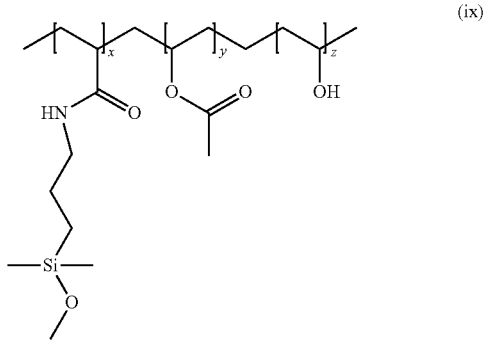

(ix)

In Formula (ix), x was 0.24, y was 0.49, and z was 0.27.
$^1$H NMR (500 MHz, $C_2H_5OH$_$d_6$) δ 0.1 (broad, Si—$CH_3$), 0.7 (broad, $CH_2$—$CH_2$), 0.9 (broad, $CH_2$—$CH_2$), 1.5 (broad, $CH_2$—$CH_2$), 2.0 (broad, OCO—$CH_3$), 3.5 (broad, Si—$OCH_3$), 4.0 (broad, $CH_2$—CH), 4.5 (broad, CH—OH), 6.7 (broad, 1H).

In the analysis results, δ 6.7 (broad, 1H) was shown, and from this, the combination of —OH of the saponified polyvinyl acetate and —NCO of the (dimethylmethoxysilyl) propyl isocyanate was confirmed.

Preparation Example 3

1 mmol of saponified polyvinyl acetate (saponification degree of 85 mol %, weight average molecular weight of 4,000 g/mol) and 10 mmol of (dimethoxymethylsilyl)propyl isocyanate were stirred and mixed in ethanol, and reacted at 80° C. for 24 hours to prepare a compound including a constituent unit represented by the following Formula (x). The compound thus prepared and including the constituent unit represented by the following Formula (x) was identified by nuclear magnetic resonance spectroscopy (HNMR).

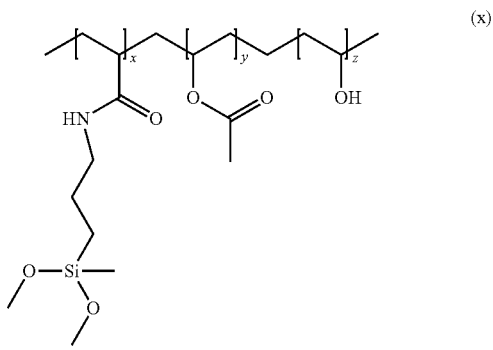

(x)

In Formula (x), x was 0.2, y was 0.1, and z was 0.7.
$^1$H NMR (500 MHz, $C_2H_5OH$_$d_6$) δ 0.1 (broad, Si—$CH_3$), 0.7 (broad, $CH_2$—$CH_2$), 0.9 (broad, $CH_2$—$CH_2$), 1.5 (broad, $CH_2$—$CH_2$), 2.0 (broad, OCO—$CH_3$), 3.5 (broad, Si—$OCH_3$), 4.0 (broad, $CH_2$—CH), 4.5 (broad, CH—OH), 6.7 (broad, 1H).

In the analysis results, δ 6.7 (broad, 1H) was shown, and from this, the combination of —OH of the saponified polyvinyl acetate and —NCO of the (dimethylmethoxysilyl) propyl isocyanate was confirmed.

Example 1

To a 20 L autoclave reactor, 270 g of styrene, 710 g of 1,3-butadiene, 5,000 g of normal hexane, and 0.86 g of 2,2-di(2-tetrahydrofuryl)propane (DTP) as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes, 20 g of 1,3-butadiene was added for capping the terminal of a polymer with butadiene. After 5 minutes, 4 mmol of (N,N-dimethylaminopropyl)trimethoxysilane was injected and reacted for 30 minutes. Then, 4 mmol of the compound prepared in Preparation Example 1 was added and the modification reaction was performed for 15 minutes. After that, a polymerization reaction was quenched using ethanol, and 45 ml of a solution of 0.3 wt % of butylated hydroxytoluene (BHT) as an antioxidant dissolved in hexane was added thereto. The polymer thus obtained was injected to hot water heated with steam, stirred to remove solvents, and roll dried to remove remaining solvents and water to prepare a modified styrene-butadiene copolymer.

Example 2

A modified styrene-butadiene copolymer was prepared by the same method described in Example 1 except for performing a modification reaction using the compound prepared in Preparation Example 2 instead of the compound prepared in Preparation Example 1.

Example 3

A modified styrene-butadiene copolymer was prepared by the same method described in Example 1 except for performing a modification reaction using the compound prepared in Preparation Example 3 instead of the compound prepared in Preparation Example 1.

Example 4

A modified styrene-butadiene copolymer was prepared by the same method described in Example 1 except for using bis(3-dimethoxymethylsilylpropyl)-N-methylamine instead of (N,N-dimethylaminopropyl)trimethoxysilane.

Comparative Example 1

To a 20 L autoclave reactor, 270 g of styrene, 710 g of 1,3-butadiene, 5,000 g of normal hexane, and 0.86 g of 2,2-di(2-tetrahydrofuryl)propane (DTP) as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes, 20 g of 1,3-butadiene was added for capping the terminal of a polymer with butadiene. After 5 minutes, 4 mmol of chlorodimethylsilane was injected, and the reaction was continued further for 15 minutes. After that, a polymerization reaction was quenched using ethanol, and 45 ml of a solution of 0.3 wt % of butylated hydroxytoluene (BHT) as an antioxidant dissolved in hexane was added thereto. The resultant polymer thus obtained was injected to hot water heated with steam, stirred to remove solvents, and roll dried to remove remaining solvents and water to prepare a styrene-butadiene copolymer. Here, the dichlorodimethylsilane was used to obtain a styrene-butadiene copolymer having a molecular weight having a similar degree as that of Example 1.

Comparative Example 2

To a 20 L autoclave reactor, 270 g of styrene, 710 g of 1,3-butadiene, 5,000 g of normal hexane, and 0.86 g of 2,2-di(2-tetrahydrofuryl)propane (DTP) as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes, 20 g of 1,3-butadiene was added for capping the terminal of a polymer with butadiene. After 5 minutes, 4 mmol of (N,N-dimethylaminopropyl)triethoxysilane was injected, and the reaction was continued further for 30 minutes. After that, a polymerization reaction was quenched using ethanol, and 45 ml of a solution of 0.3 wt % of butylated hydroxytoluene (BHT) as an antioxidant dissolved in hexane was added thereto. The resultant polymer thus obtained was injected to hot water heated with steam, stirred to remove solvents, and roll dried to remove remaining solvents and water to prepare a modified styrene-butadiene copolymer.

Experimental Example 1

With respect to each of the modified styrene-butadiene copolymers of Examples 1 to 3 and Comparative Example 2, and the styrene-butadiene copolymer of Comparative example 1, the styrene derived unit content and the vinyl content in a copolymer, the weight average molecular weight (Mw), the number average molecular weight (Mn), the polydispersity index (PDI), and the mooney viscosity (MV) were measured. The results are listed in Table 1 below.

1) Analysis of Styrene Derived Unit (SM) Content and Vinyl Content

The styrene derived unit (SM) content and the vinyl content in each copolymer were measured by using NMR.

2) Analysis of Molecular Weight

The weight average molecular weight (Mw) and number average molecular weight (Mn) of each copolymer were measured by gel permeation chromatography (GPC) analysis under conditions of 40° C. In this case, two columns of PLgel Olexis and one column of PLgel mixed-C manufactured by Polymer Laboratories Co. Ltd. were used in combination as columns, and newly replaced columns were all mixed bed type columns. In addition, polystyrene (PS) was used as a GPC standard material for calculating the molecular weight. The polydispersity index (PDI) was calculated as a ratio (Mw/Mn) of the weight average molecular weight and the number average molecular weight, which were measured by the above method.

3) Analysis of Mooney Viscosity

Two specimens having a weight of at least 15 g were pre-heated for 1 minute and then heated at 100° C. for 4 minutes, and measurement was conducted using MV-2000 (Alpha Technologies Co., Ltd.).

TABLE 1

| Division | Styrene (wt %) | Vinyl (wt %) | GPC | | | Mooney viscosity (MV) |
| --- | --- | --- | --- | --- | --- | --- |
| | | | Mw (g/mol, ×10$^4$) | Mn (g/mol, ×10$^4$) | PDI | |
| Example 1 | 27.1 | 43.1 | 30 | 20 | 1.5 | 50 |
| Example 2 | 26.5 | 42.5 | 34 | 22 | 1.6 | 55 |
| Example 3 | 27.3 | 44.1 | 31 | 21 | 1.5 | 53 |
| Example 4 | 27.3 | 44.1 | 31 | 21 | 1.5 | 53 |
| Comparative Example 1 | 26.2 | 43.1 | 28 | 20 | 1.4 | 47 |
| Comparative Example 2 | 27.1 | 43.0 | 29 | 18 | 1.6 | 45 |

As shown in Table 1, the mooney viscosity of the modified styrene-butadiene copolymers of Examples 1 to 4 according to example embodiments of the present invention was found to increase when compared to the mooney viscosity of the copolymers of Comparative Examples 1 and 2.

Particularly, the styrene-butadiene copolymer of Comparative Example 1 was prepared by the same conditions as those for preparing the modified styrene-butadiene copolymers of Examples 1 to 4 except for not performing the modification reaction. From the results in Table 1 in which the mooney viscosity of the modified styrene-butadiene copolymers of Examples 1 to 4 was increased when compared to that of the styrene-butadiene copolymer of Comparative Example 1, the modified styrene-butadiene copolymers of Examples 1 to 4 were found to be modified.

Experimental Example 2

In order to comparatively analyze the physical properties of a rubber composition including each of the modified styrene-butadiene copolymers of Examples 1 to 4 and Comparative Examples 2, and the styrene-butadiene copolymer of Comparative Example 1, and molded articles manufactured from the rubber composition, tensile properties and viscoelasticity properties were measured. The results are listed in Table 2 below.

1) Preparation of Rubber Composition

Each rubber composition was prepared via a first stage mulling and a second stage mulling. In this case, the amounts used of materials excluding the modified and conjugated diene-based copolymer were indicated based on 100 parts by weight of the modified and conjugated diene-based copolymer. In the first stage mulling, 137.5 parts by weight of each modified and conjugated diene-based copolymer, 70 parts by weight of silica, 11.2 parts by weight of bis(3-triethoxysilylpropyl)tetrasulfide as a silane coupling agent, 25 parts by weight of a process oil (TDAE), 2 parts by weight of an antiaging agent (TMDQ), 3 parts by weight of zinc oxide (ZnO), 2 parts by weight of stearic acid, and 1 part by weight of wax were mixed and mulled by using a banbury mixer equipped with a temperature controlling apparatus. In this case, the temperature of the mulling apparatus was controlled, and a first compound mixture was obtained at a discharge temperature of 145° C. to 155° C. At the second stage mulling, the first compound mixture was cooled to room temperature, and 1.75 parts by weight of a rubber accelerator (CZ), 1.5 parts by weight of a sulfur powder, and 2 parts by weight of a vulcanization accelerator were added to the mulling apparatus and mixed at a temperature of 100° C. or less to obtain a second compound mixture. Then, each rubber composition was prepared via a curing process at 100° C. for 20 minutes.

2) Tensile Properties

Tensile properties were measured by manufacturing each specimen and measuring tensile strength when broken and tensile stress when elongated by 300% (300% modulus) of each specimen according to an ASTM 412 tensile test method. Particularly, a Universal Test machine 4204 tensile tester (Instron Co., Ltd.) was used, and measurement was performed at room temperature at a rate of 50 cm/min, to obtain a tensile strength value and a tensile stress value when elongated by 300%.

3) Viscoelasticity Properties

Viscoelasticity properties were measured by using a dynamic mechanical analyzer (TA Co., Ltd). Tan δ was measured by changing deformation at each measurement temperature (−60° C. to 60° C.) with a twist mode and a frequency of 10 Hz. If the Tan δ at a low temperature of 0° C. is high, wet traction is good, and if the Tan δ at a high temperature of 60° C. is low, hysteresis loss is small, low rolling resistance of a tire (low fuel consumption ratio) is good.

C. was decreased to the minimum of 75% for the modified styrene-butadiene copolymers of Examples 1 to 4 when compared to those of the modified styrene-butadiene copolymer of Comparative Example 2.

The results indicate that the modified styrene-butadiene copolymer prepared using the compound including a constituent unit represented by Formula 1 according to an embodiment of the present invention as a modifier attained good wet traction and rolling resistance, and a high fuel consumption ratio when compared to the unmodified styrene-butadiene copolymer and other modified styrene-butadiene copolymers.

The invention claimed is:

1. A compound comprising a constituent unit represented by the following Formula 1:

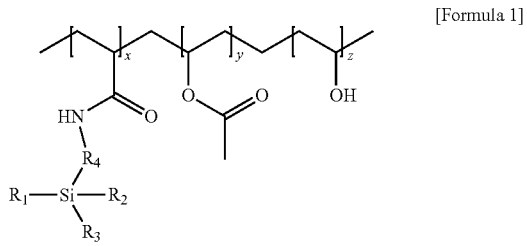

[Formula 1]

TABLE 2

| Division | | Example 1 | Example 2 | Example 3 | Example 4 | Comparative Example 1 | Comparative Example 2 |
|---|---|---|---|---|---|---|---|
| Tensile properties | Tensile strength (kgf/cm²) | 135 | 130 | 135 | 140 | 120 | 128 |
| | 300% modulus (kgf/cm²) | 125 | 122 | 127 | 130 | 100 | 110 |
| Viscoelasticity | Tan δ at 0° C. (Index) | 1.39 | 1.32 | 1.35 | 1.42 | 1.29 | 1.31 |
| | Tan δ at 60° C. (Index) | 0.055 | 0.060 | 0.055 | 0.051 | 0.080 | 0.068 |

As shown in Table 2, the tensile and viscoelasticity properties of rubber compositions including the modified styrene-butadiene copolymers of Examples 1 to 4, which were prepared using the compound prepared in Preparation Example 1 or 2 according to an embodiment of the present invention as the modifier were found to be better when compared to those of the rubber compositions including the copolymers of Comparative Examples 1 and 2.

In particular, it was found that tensile strength and 300% modulus were largely increased, a Tan δ value at 0° C. was increased to the maximum of 116%, and a Tan δ value at 60° C. was decreased to the minimum of 64% for the rubber compositions including the modified styrene-butadiene copolymers prepared according to Examples 1 to 4, which were prepared using the compound prepared in Preparation Example 1 or 2 according to an embodiment of the present invention as the modifier when compared to the rubber composition including the unmodified styrene-butadiene copolymer of Comparative Example 1.

In addition, when comparing the modified styrene-butadiene copolymer of Comparative Example 2, which was prepared by performing modification reaction only once using the compound corresponding to Formula 2 of the present invention and the modified styrene-butadiene copolymers of Examples 1 to 4 when performing a modification reaction, it was found that largely increased tensile strength and 300% modulus were shown, a Tan δ value at 0° C. was increased to the maximum of 108%, and a Tan δ value at 60° in Formula 1, $R_1$ to $R_3$ are each independently $C_{1-20}$alkyl, $C_{1-20}$alkoxy, or $C_{3-20}$allyl, where at least one of $R_1$ to $R_3$ is $C_{1-20}$alkoxy, $R_4$ is $C_{1-20}$alkylene, x, y and z each independently represent a molar ratio of each repeating unit constituting the constituent unit, where x+y+z is 1, x is 0.1 to 0.8, y is 0.1 to 0.8, and z is 0.1 to 0.7.

2. The compound of claim 1, wherein in Formula 1, $R_1$ to $R_3$ are each independently $C_{1-10}$alkyl, or $C_{1-10}$alkoxy, where at least one of $R_1$ to $R_3$ is $C_{1-10}$alkoxy, and $R_4$ is $C_{1-10}$alkylene.

3. A modifier for a conjugated diene-based polymer comprising the compound of claim 1.

4. A modified and conjugated diene-based polymer represented by the following Formula 4 or Formula 5, and comprising a functional group derived from the compound described in claim 1:

[Formula 4]

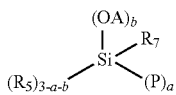

in Formula 4,
$R_5$ is $C_{1-20}$alkyl, $C_{1-20}$alkoxy, or $C_{3-20}$allyl,
$R_7$ is $C_{1-20}$alkyl or alkylsilyl, each of which is unsubstituted or substituted with $C_{1-20}$alkyl or alkylsilyl where Si in alkylsilyl is mono-, di- or tri-substituted with $C_{1-20}$alkyl, where the $C_{1-20}$alkyl or alkylsilyl comprises at least one heteroatom selected from N, O and S,
P is a conjugated diene-based polymer chain,
a and b are each independently an integer of 1 or 2, where a+b is 2 or 3,

[Formula 5]

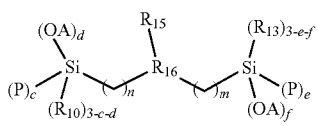

in Formula 5,
$R_{10}$ and $R_{13}$ are each independently $C_{1-20}$alkyl, $C_{1-20}$alkoxy, or $C_{3-20}$allyl,
$R_{15}$ is $C_{1-20}$alkyl or alkylsilyl, each of which is unsubstituted or substituted with $C_{1-20}$alkyl or alkylsilyl where Si in alkylsilyl is mono-, di- or tri-substituted with $C_{1-20}$alkyl, where the $C_{1-20}$alkyl or alkylsilyl comprises at least one heteroatom selected from N, O and S,
$R_{16}$ is a heteroatom of N, O, or S, where in a case where $R_{16}$ is O or S, $R_{15}$ is not present,
P is a conjugated diene-based polymer chain,
c to f are each independently an integer of 0 to 3, where c+e is 1 to 5, and d+f is 1 to 3,
n and m are each independently an integer of 1 to 1000,
in Formula 4 and Formula 5, A is a substituent represented by the following Formula 6:

[Formula 6]

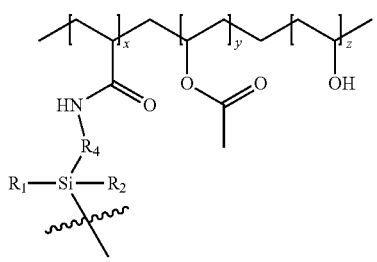

in Formula 6,
$R_1$ and $R_2$ are each independently $C_{1-20}$alkyl, $C_{1-20}$alkoxy, or $C_{3-20}$allyl,
$R_4$ is $C_{1-20}$alkylene,
x, y and z represent each independently a molar ratio of each repeating unit constituting the constituent unit, where x+y+z is 1,
x is 0.1 to 0.8,
y is 0.1 to 0.8, and
z is 0.1 to 0.7.

5. The modified and conjugated diene-based polymer of claim 4, wherein in Formula 4 to Formula 6, $R_1$, $R_2$, $R_5$, $R_{10}$ and $R_{13}$ are each independently $C_{1-10}$alkyl, or $C_{1-10}$alkoxy,
$R_4$ is $C_{1-10}$alkylene,
$R_7$ and $R_{15}$ are each independently $C_{1-10}$alkyl which is unsubstituted or substituted with $C_{1-10}$alkyl or alkylsilyl where Si in alkylsilyl is mono-, di- or tri-substituted with $C_{1-10}$alkyl, where the $C_{1-10}$alkyl comprises N or S,
$R_{16}$ is N, and
n and m are each independently an integer of 1 to 50.

6. The modified and conjugated diene-based polymer of claim 4, wherein the polymer comprises an aromatic vinyl-based monomer derived unit in an amount of 40 wt % or less.

7. The modified and conjugated diene-based polymer of claim 4, wherein the polymer has a number average molecular weight of 1,000 g/mol to 5,000,000 g/mol.

8. The modified and conjugated diene-based polymer of claim 4, wherein the polymer has a vinyl content of 5 wt % or more.

9. A method for preparing the modified and conjugated diene-based polymer of claim 4, the method comprising:
1) polymerizing a conjugated diene-based monomer, or an aromatic vinyl-based monomer and a conjugated diene-based monomer in the presence of an organometal compound in a hydrocarbon solvent to prepare an active polymer in which an organometal is combined with at least one terminal thereof;
2) performing a first reaction of the active polymer with a compound represented by the following Formula 2 or Formula 3; and
3) performing, after performing the first reaction, a second reaction with a compound comprising a constituent unit represented by the following Formula 1:

[Formula 2]

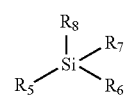

in Formula 2,
$R_5$, $R_6$ and $R_8$ are each independently $C_{1-20}$alkyl, $C_{1-20}$alkoxy, or $C_{3-20}$allyl, where at least one of $R_5$, $R_6$ and $R_8$ is $C_{1-20}$alkoxy,
$R_7$ is $C_{1-20}$alkyl or alkylsilyl, which is unsubstituted or substituted with $C_{1-20}$alkyl or alkylsilyl where Si in alkylsilyl is mono-, di- or tri-substituted with $C_{1-20}$alkyl, where the $C_{1-20}$alkyl or alkylsilyl comprises at least one heteroatom selected from N, O and S,

[Formula 3]

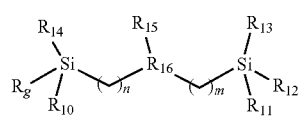

in Formula 3, $R_9$ to $R_{14}$ are each independently $C_{1-20}$alkyl, $C_{1-20}$alkoxy, or $C_{3-20}$allyl, where at least one of $R_9$ to $R_{14}$ is $C_{1-20}$alkoxy,
$R_{15}$ is $C_{1-20}$alkyl or alkylsilyl, which is unsubstituted or substituted with $C_{1-20}$alkyl or alkylsilyl where Si in alkylsilyl is mono-, di- or tri-substituted with $C_{1-20}$alkyl, where the $C_{1-20}$alkyl or alkylsilyl comprises at least one heteroatom selected from N, O and S, $R_{16}$ is a heteroatom of N, O, or S, and when $R_{16}$ is O or S, $R_{15}$ is not present, n and m are each independently an integer of 1 to 1000,

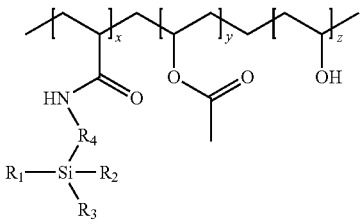

[Formula 1]

in Formula 1, $R_1$ to $R_3$ are each independently $C_{1-20}$alkyl, $C_{1-20}$alkoxy, or $C_{3-20}$allyl, where at least one of $R_1$ to $R_3$ is $C_{1-20}$alkoxy, $R_4$ is $C_{1-20}$alkylene, x, y and z represent each independently a molar ratio of each repeating unit constituting the constituent unit, where x+y+z is 1, x is 0.1 to 0.8, y is 0.1 to 0.8, and z is 0.1 to 0.7.

10. The method for preparing the modified and conjugated diene-based polymer of claim 9, wherein in Formula 1, $R_1$ to $R_3$ are each independently $C_{1-10}$alkyl, or $C_{1-10}$alkoxy, where at least one of $R_1$ to $R_3$ is $C_{1-10}$alkoxy, and $R_4$ is $C_{1-10}$alkylene.

11. The method for preparing the modified and conjugated diene-based polymer of claim 9, wherein in Formula 2, $R_5$, $R_6$, and $R_8$ are each independently $C_{1-10}$alkyl, or $C_{1-10}$alkoxy, where at least one of $R_5$, $R_6$, and $R_8$ is $C_{1-10}$alkoxy, and $R_7$ is $C_{1-10}$alkyl which is unsubstituted or substituted with $C_{1-10}$alkyl or alkylsilyl where Si in alkylsilyl is mono-, di- or tri-substituted with $C_{1-10}$alkyl, where the $C_{1-10}$alkyl comprises N or S.

12. The method for preparing the modified and conjugated diene-based polymer of claim 9, wherein in Formula 3, $R_9$ to $R_{14}$ are each independently $C_{1-10}$alkyl, or $C_{1-10}$alkoxy, where at least one of $R_9$ to $R_{14}$ is $C_{1-10}$alkoxy, $R_{15}$ is $C_{1-10}$alkyl; or $C_{1-10}$alkyl which is unsubstituted or substituted with $C_{1-10}$alkyl or alkylsilyl where Si in alkylsilyl is mono-, di- or tri-substituted with $C_{1-10}$alkyl, where the $C_{1-10}$alkyl comprises N or S, $R_{16}$ is N, and n and m are each independently an integer of 1 to 50.

13. The method for preparing the modified and conjugated diene-based polymer of claim 9, wherein the organometal compound is used in a ratio of 0.01 mmol to 10 mmol based on 100 g of total monomers.

14. The method for preparing the modified and conjugated diene-based polymer of claim 9, wherein the organometal compound is at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

15. The method for preparing the modified and conjugated diene-based polymer of claim 9, wherein the polymerizing of step 1) is performed by further adding a polar additive.

16. The method for preparing the modified and conjugated diene-based polymer of claim 15, wherein the polar additive is included in an amount of 0.001 parts by weight to 10 parts by weight based on 100 parts by weight of a total amount of the monomers.

17. The method for preparing the modified and conjugated diene-based polymer of claim 9, wherein the compound represented by Formula 2 or Formula 3 is used in a ratio of 0.01 mol to 5 mol based on 1 mol of the organometal compound.

18. The method for preparing the modified and conjugated diene-based polymer of claim 9, wherein the compound represented by Formula 1 is used in a ratio of 0.01 mol to 5 mol based on 1 mol of the organometal compound.

* * * * *